United States Patent
Brost

[11] 3,889,710
[45] June 17, 1975

[54] CHECK VALVE WITH ELASTOMERIC VALVE ELEMENT

[76] Inventor: Julien H. Brost, 56 Sauganash Dr., Fontana, Wis. 53125

[22] Filed: Jan. 11, 1974

[21] Appl. No.: 432,610

Related U.S. Application Data

[63] Continuation of Ser. No. 307,352, Nov. 7, 1972, abandoned.

[52] U.S. Cl. .................... 137/512.15; 137/525
[51] Int. Cl. .............................................. F16k 15/00
[58] Field of Search ..... 137/102, 525, 525.1, 525.3, 137/525.5, 512.15, 533, 516.15

[56] References Cited
UNITED STATES PATENTS

| | | | |
|---|---|---|---|
| 797,739 | 8/1905 | Meer | 137/516.15 |
| 1,412,473 | 4/1922 | Lane | 137/102 |
| 1,506,012 | 8/1924 | Lewis | 137/102 |
| 2,547,377 | 4/1951 | Juhasz | 137/525.3 |
| 3,247,866 | 4/1966 | Sanz | 137/533 |
| 3,664,371 | 5/1972 | Schneider | 137/525 |

Primary Examiner—Martin P. Schwadron
Assistant Examiner—George L. Walton
Attorney, Agent, or Firm—Larson, Taylor and Hinds

[57] ABSTRACT

The invention relates to a check valve comprising two rigid body members which cooperate to provide a valve chamber with generally opposed inlet and outlet passageways. One of the body members defines a concave seating surface surrounding the inlet passageway and the other member defines the outlet passageway and an abutment structure confronting but spaced from the center of the concave seating surface. A normally flat elastomeric valve disk, smaller than the seating surface, is located between that surface and the abutment structure, which flexes or dishes the disk to maintain its periphery in sealing contact with the seating surface. Fluid pressure against the face of the disk engaged by the abutment structure increases its sealing engagement with the seating surface, but pressure on the opposite disc face overcomes the resiliency of the disk and allows fluid to flow around its periphery to the outlet passageway.

21 Claims, 6 Drawing Figures

PATENTED JUN 17 1975  3,889,710

CHECK VALVE WITH ELASTOMERIC VALVE ELEMENT

This is a continuation of application Ser. No. 307,352, filed Nov. 7, 1972, now abandoned.

BACKGROUND OF THE INVENTION

FIELD OF THE INVENTION

The present invention relates to check valves, i.e. valves adapted to allow the passage or pressurized fluid in only one direction, and more particularly to an improved check valve employing an elastomeric disk as the valve element.

DESCRIPTION OF THE PRIOR ART

Many types of check valves have been developed which use an elastomeric valve element retained against a valve seat by its own resiliency so that fluid can pass through the valve in the direction in which it deflects the valve element away from the seat but cannot flow in the opposite direction in which the seating pressure is increased by the fluid. In previously known check valves of this type, however, the configuration of the valve element generally has been such as to require it to be either a relatively expensive molded component or an undesirably fragile element cut from sheet material. Furthermore, the production of such valves has heretofore been complicated by the need to align the valve element accurately with other valve components and/or to physically attach it to one or more of such other components during the assembly operation. Additionally, because prior art check valves of this type have required the valve element to always engage the same area of the valve seat, a piece of grit or the like that may become accidentally imbedded in the sealing face of the resilient element repeatedly scratches the same region of the seat and rapidly destroys the effectiveness of the valve.

SUMMARY OF THE INVENTION

The principle object of the present invention is to provide a simple and reliable check valve comprising only three basic components including an elastomeric valve disk adapted to be cut from sheet material.

Another object of the invention is to simplify the assembly of such valves without complicating the structure thereof.

Still another object of the invention is to provide a check valve particularly suited to embody simple molded plastic body members.

A further object of the invention is to provide such a check valve with a valve element that is capable of repositioning itself with respect to the seat surface engaged thereby.

Another object of the invention is to provide a simple and inexpensive check valve capable of responding to relatively low pressure differentials.

Yet another object of the invention is to provide an improved elastomeric disk check valve particularly suitable for miniature applications.

Briefly, these and other related objectives are realized in accordance with the present invention by means of a check valve comprising two rigid body members which cooperate to provide a valve chamber with generally opposed inlet and outlet passageways. One of the body members defines a concave seating surface surrounding the input passageway and the other body member includes an abutment structure confronting but spaced from the center of the concave seating surface. A normally flat elastomeric valve disk, smaller than the seating surface, is located between that surface and the abutment structure, which flexes or dishes the disk to maintain its periphery in sealing contact with the seating surface. Fluid pressure against the face of the disk engaged by the abutment structure increases its sealing engagement with the seating surface, but pressure on the opposite disk face overcomes the resiliency of the disk and allows fluid to flow around its periphery to the outlet passageway.

Various means for practicing the invention and other advantages and novel features thereof will be apparent from the following detailed description of an illustrative preferred embodiment of the invention, reference being made to the accompanying drawings in which like reference numerals denote like elements.

IN THE DRAWINGS

Figure 2:
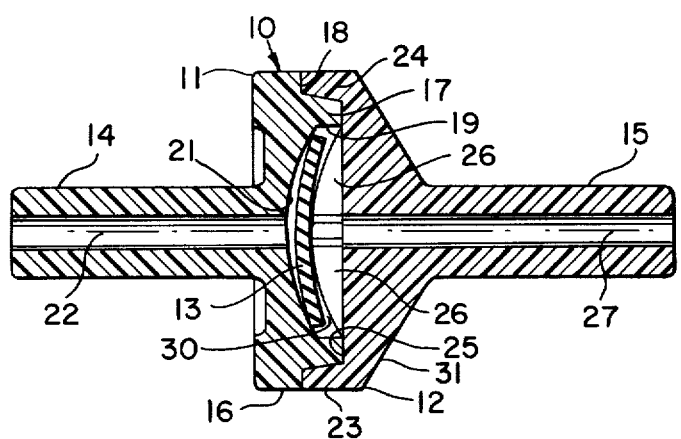
FIG. 2 is a longitudinal cross sectional view of the illustrative valve taken along line 2—2 of FIG. 1.
Figure 5:
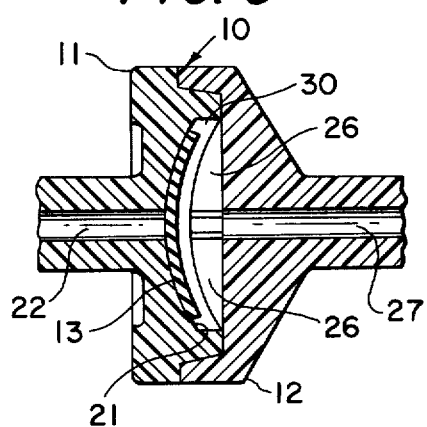
Figure 6:
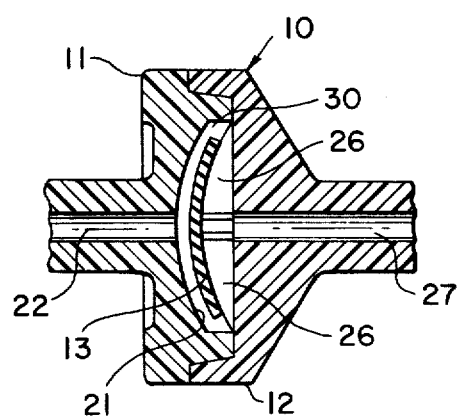

FIG. 5 corresponds to a portion of FIG. 2 and illustrates the closed position of the valve disk in which it prevents fluid from flowing through the valve from the outlet passageway to the inlet passageway; and FIG. 6 is similar to FIG. 5 but shows the open position of the valve disk when fluid is passing through the valve from its inlet passageway to its outlet passageway.

DESCRIPTION OF THE ILLUSTRATIVE PREFERRED EMBODIMENT

Figure 1:
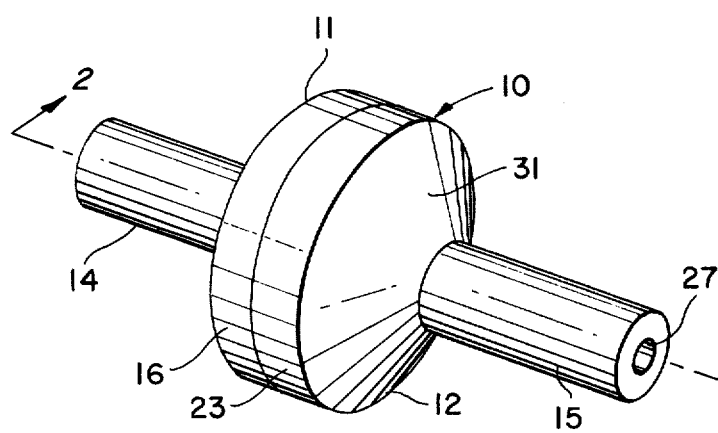
FIG. 1 is a perspective view of a check valve according to a preferred illustrative embodiment of the invention.

The illustrative valve shown in the accompanying drawings is particularly suited to be of relatively small size for use in low or moderate pressure applications such as fluidic logic circuits, carburetor control systems, vacuum operated windshield devices, etc. As previously mentioned, the valve 10 is made up of only three basic components; mainly an inlet body member 11, and outlet body member 12 and an elastomeric valve disk 13. The two body members are preferably injection molded components made of nylon or any other suitable plastic material and the valve disk is preferably die cut out of a flat smooth sheet of elastomeric material such as natural or synthetic rubber. Alternatively, the valve disk can be an injection molded elastomeric member, in which case its seating face is either smooth or provided with concentric seating ridges. When the valve is assembled, as best shown in FIGS. 1 and 2, the two body members 11 and 12 are joined in coaxial relation to each other with their respective inlet and outlet tubes 14 and 15 extending in opposite directions along the central valve axis to permit the valve to connect two pieces of a flexible hose or tube slid over the corresponding valve tubes.

Figure 4:
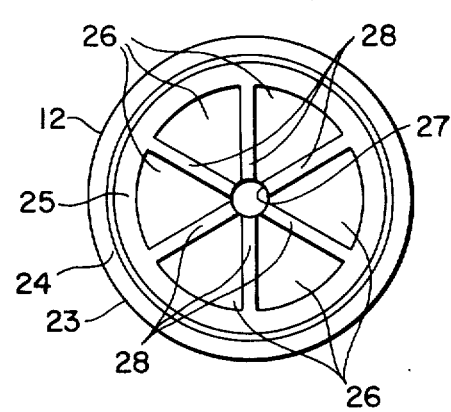
FIG. 4 is an end elevation view of the outlet member of the illustrative valve showing the abutment structure embodied therein.

The inlet body member 11 includes a cylindrical head 16 provided with an annular rib 17 that defines a peripheral notch 18 and an internal cylindrical wall 19 encircling a concave seating surface 21 that surrounds an inlet passageway 22 extending along the axis of the inlet tube 14. The outlet body member likewise includes a cylindrical head 23 provided with a peripheral axial lip 24 that encircles a flat annular face surface 25 surrounding a convex abutment structure comprising six radially disposed abutment members 26. As best illustrated in FIG. 4, these abutment members are symmetrically disposed about axial outlet passageway 27 continuing through outlet tube 15 and are separated by radial slots 28 extending from that passageway to the periphery of the abutment structure. The sector shaped faces of the abutment members preferably are coincident with an imagnary spherical or conical surface coaxial with the valve, but different forms of either single or plural abutment members could be substituted for this preferred structure.

Figure 3:
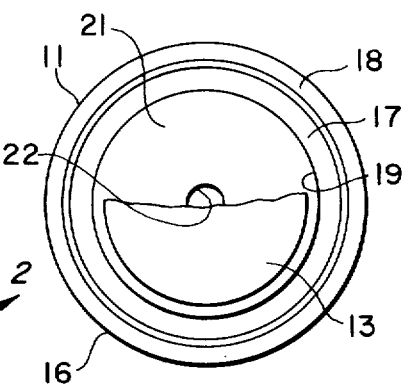
FIG. 3 is an end elevation view of the inlet member of the illustrative valve, depicting the elastomeric valve disk in its operative position but partially broken away to show the concave seating surface.

To assemble the valve, the inlet body member is supported with its head facing upwardly and the elastomeric valve disk 13 is placed on the concave seating surface 21 as shown in FIG. 3, which is very easily accomplished inasmuch as the outer diameter of the valve disk is substantially smaller than the inner diameter of wall 19 surrounding the seating surface. The outlet body member is then mated with the inlet member and those two members are permanently sealed together in fluid-tight relation to each other. Preferably, the peripheral surface of the inlet body member rib 17 and the mating surface of outlet body member lip 24 are tapered and adapted to provide an interference fit with each other to facilitate sealing the two body members together by ultrasonic welding. Alternatively, the two body members can be joined by heat sealing, solvent welding, spin welding, cementing or any other other appropriate technique. Regardless of the sealing process employed, however, it will be seen that rib 17 isolates the sealed area from the internal valve chamber 30 to prevent excess sealing material from reaching that chamber.

Referring now particularly to FIG. 2, when the valve is assembled, the apexes of the abutment members 26 adjacent outlet passageway 27 centrally engage the confronting face of valve disk 13 so that the latter is dished toward but not into engagement with the central region of the seating surface 21 while the periphery of the disk is pressed against that surface by the resilient tendency of the disk to assume its normal flat condition. Because a circular disk engages any portion of a spherical surface along a flat plane, the preferred valve construction employs a normally flat circular valve disk and a substantially spherical seating surface; but the resiliency of the disk allows both it and the concave seating surface to deviate substantially from those ideal shapes without detracting significantly from the operation of the valve. In all cases, however, it is essential that the abutment means engageable with the central portion of the disk is spaced from the concave or female seating surface by more than the thickness of the disk but is close enough to the seating surface to resiliently distort the disk when the latter is in peripheral engagement with that surface.

When the fluid pressure in the outlet passageway 27 exceeds the pressure in the inlet passageway 22, the valve disk is thereby further distorted into contact with substantially all of the corresponding area of the seating surface, as shown in FIG. 5, thus insuring tight sealing of the inlet passageway without imposing destructively high unit pressures on either the valve disk or the seating surface. When the inlet passage pressure exceeds the outlet passage pressure, however, the periphery of the valve disk is flexed partially or wholly out of contact with the seating surface as shown in FIG. 6; whereby fluid can pass around the edge of the disk and through slots 28 into the outlet passageway. As shown at numeral 31 in FIGS. 1 and 2, the external axial face of the outlet body member 12 is tapered to provide an arrow-like representation of the direction in which fluid can pass through the valve; thereby simplifying the proper installation of the valve.

Although the drawings illustrate the valve disk in a central or coaxial position relative to the body members, it should be recognized that the disk can shift edgewise in any direction against internal cylindrical wall 19, but that such movement does not detract from the proper performance of the valve inasmuch as the valve disk cannot move beyond confronting alignment with passageway 22. In addition to simplifying the assembly of the valve, such lateral freedom of the disk is also advantageous in that it allows the latter continuously to seek different positions and thereby uniformly distributes any wear that may occur between the disk and the seating surface. Furthermore, it should be apparent that the sensitivity of the valve to pressure differentials between its inlet and outlet passageways can be easily modified by altering the thickness or elastomeric resiliency of the valve disk or by changing the relation of the seating surface to the abutment structure.

The invention has been described in detail with particular reference to an illustrative preferred embodiment thereof, but it will be understood that variations and modifications can be effected within the spirit and scope of the invention as described hereinabove and as defined in the appended claims.

I claim:

1. A check valve comprising:

a housing defining a chamber having first and second opposing ends, an inlet passage having an opening entering the chamber through one of said opposing ends and an outlet passage having an opening entering the chamber through the other of said opposing ends, an annular portion of said one end of the chamber immediately surrounding the inlet passage opening forming an annular concave valve seat, an abutment means in the chamber, fluid openings being provided through the abutment means to permit fluid to flow from the inlet passage therethrough to the outlet passage, one end of the abutment means projecting towards the inlet opening, a resilient disc which is essentially flat in its relaxed condition extending transversely across the chamber between the said one end of the abutment means and the annular valve seat, said disc being of a sufficiently large cross-section, taken in the direction transverse to the flow direction, that in its normal closed condition in the chamber, the said one end of the abutment means engages the central portion of the disc on the side thereof facing the outlet opening and flexes the disc convexly toward the inlet opening as the outer periphery of the disc sealingly engages the annular valve seat, said fluid openings in the abutment means positioned to remain open for fluid flow from the inlet opening around the outer periphery of the disc and through the fluid openings to the outlet opening when the resilient disc has flexed toward the outlet opening as far as its outer dimensions and resilience allow when subjected to the largest possible pressure differential from the inlet opening toward the outlet opening, said resilient disc having sufficient resiliency and arranged to increase the area of its sealing contact with the annular concave valve seat from said initial sealingly engaging outer periphery, radially inwardly, as the fluid forces from the outlet toward the inlet increase beyond the flexing force exerted by the abutment means on the disc, and the outer periphery of the disc, when in the said normal closed position, being spaced radially inwardly from the outer periphery of the concave valve seat, permitting at least slight transverse movement of the disc within the chamber when sealingly engaging the annular valve seat.

2. A check valve according to claim 1, said abutment means including a central portion which includes said one end engaging the disc, and portions extending transversely from the central portion including said fluid openings.

3. A check valve according to claim 2, in which the abutment means are integral with the said other end of the chamber and comprise a plurality of abutment protrusions spaced from each other and surrounding the said outlet opening within said chamber.

4. A check valve according to claim 2, said abutment means comprising sector shaped elements separated by a plurality of radial grooves extending radially outwardly from said outlet opening a greater radial distance than the radius of the disc.

5. A check valve according to claim 4, in which said sector shaped elements define a portion of a spherical surface concentric with the axis of the outlet passage.

6. A check valve according to claim 1, including an inlet body member including said inlet opening and said annular valve seat, and an outlet body member forming the other end of the chamber and said outlet opening.

7. A check valve according to claim 6, said inlet and outlet body members being generally cylindrical and constructed to mate together coaxially, said inlet and outlet passages being located along the common central axis of said mated body members.

8. A check valve according to claim 7, in which one of said body members comprises an internal cylindrical annular rib and the other body member includes an annular lip adapted to mate with the external surface of the said annular rib to enclose said chamber.

9. A check valve according to claim 1, said annular valve seat defining a portion of a sphere.

10. A check valve according to claim 9, said abutment means defining a portion of a sphere concentric with the spherical portion of the valve seat.

11. A check valve having means including opposed spaced apart first and second walls defining a chamber, an inlet passage opening into the first wall and an outlet passage opening into the second wall, the direction from the first wall to the second wall being defined as the longitudinal direction of the valve, said first wall including an essentially annular portion which is continuously concave, the said inlet passage opening into the center of this annular concave portion, said second wall including raised abutments located about the opening to the outlet passage to form airflow passageways between the abutments in a direction transverse to the longitudinal direction from the transverse outer limits of the abutments inwardly to the outlet passage, and a resilient disc which is essentially flat in its relaxed condition located in the chamber and extending transversely across the space between the first and second walls, the transverse outer periphery of the disc engaging the annular concave portion, the disc being of smaller cross-section in the transverse direction than the outer limits of the annular concave portion but larger than the inner limits of the annular concave portion, the disc thus being movable transversely within the space such that its sealing peripheral edge can sealingly engage different parts of the annular concave portion, the said abutments engaging the central part of the side of the disc facing the second wall and resiliently flexing the central part of the disc towards the first wall beyond any plane at which the peripheral edge of the disc can sealingly engage the annular concave portion, such that, in the rest condition of the valve, the disc is convex towards the first wall to form said sealing engagement of the disc edge with the annular portion, the disc being sufficiently resilient such that when fluid forces from the outlet toward the inlet exceed the flexing force of the abutment on the disc, the surface of the disc facing the first wall moves against the annular portion to enlarge the sealing area between the disc and the first wall, and said abutments extending transversely a greater distance than the outer periphery of the disc such that when the disc is urged by fluid forces from the inlet to the outlet as far as possible against the second wall, a fluid flow path is provided from the inlet opening around the outer periphery of the disc and between the abutments to the outlet openings.

12. A check valve according to claim 11, said valve being formed of a one-piece inlet body member including said inlet passage and said first wall and a one-piece outlet body member including said second wall and said outlet passage.

13. A check valve according to claim 12, in which said inlet and outlet body members include respective generally cylindrical heads adapted to mate together in coaxial confronting alignment with each other, said inlet and outlet passages being located along the common central axis of said mated body members.

14. A check valve according to claim 12, in which said valve disc is substantially circular and is cut from a flat sheet of resilient material.

15. A check valve according to claim 12, in which one of said body members comprises an internal cylindrical annular rib and the other body member includes an annular lip adapted to mate with the external surface of said annular rib to enclose the said chamber.

16. A check valve according to claim 12, in which said abutments are integral with said outlet body member and comprise a plurality of abutment protrusions spaced from each other and surrounding said outlet passage within said valve chamber.

17. A check valve according to claim 12, in which said annular concave portion of the first wall defines a portion of a sphere.

18. A check valve according to claim 13, in which said inlet and outlet body members include respective inlet and outlet tubes extending beyond said heads along said common axis.

19. A check valve according to claim 16, in which said abutments comprise sector shaped elements separated by a plurality of radial grooves extending radially outwardly from said outlet passage and terminating beyond the outer radial periphery of the disc.

20. A check valve according to claim 19, in which said sector shaped elements define a portion of a spherical surface concentric with the axis of said outlet body member.

21. A check valve according to claim 19, in which said sector shaped elements define a conical surface coaxial with the axis of said outlet body member.

* * * * *